United States Patent [19]

Carroll

[11] Patent Number: 5,058,174
[45] Date of Patent: Oct. 15, 1991

[54] SYSTEM AND METHOD FOR GENERATING A PATTERN FROM AN IMAGE

[76] Inventor: Thomas M. Carroll, 1920 S. Broadway, St. Louis, Mo. 63104

[21] Appl. No.: 407,059

[22] Filed: Sep. 14, 1989

[51] Int. Cl.$^5$ .......................... G06K 9/00; G06F 15/46
[52] U.S. Cl. ........................................ 382/1; 139/319; 358/101; 364/470; 382/8
[58] Field of Search ................. 382/1, 52, 8; 364/470; 358/78, 93, 101; 139/318, 319; 66/238

[56] References Cited

U.S. PATENT DOCUMENTS

| | | | |
|---|---|---|---|
| 4,078,253 | 3/1978 | Kajiura et al. | 364/470 |
| 4,613,948 | 9/1986 | Gharavi | 382/52 |
| 4,829,370 | 5/1989 | Mayne et al. | 358/78 |
| 4,893,181 | 1/1990 | Yeomans | 358/78 |

Primary Examiner—Leo H. Boudreau
Attorney, Agent, or Firm—Senniger, Powers, Leavitt & Roedel

[57] ABSTRACT

A method and apparatus for generating a pattern for making rugs corresponding to a predefined image. The predefined image is scanned by a video camera to generate a video image corresponding to the predefined image. A frame grabber captures one frame of the video image. The captured image is isolated and compressed by a CPU into a compressed image corrresponding to the video image and having a limited number of subareas, each subarea having a color. The CPU compares the color of each subarea to the colors in a look-up table to define a 48-color image. A printer creates from the 48-color image the pattern corresponding to the predefined image and an inventory identifying the numbers and colors of yarns needs to make a rug from the pattern.

35 Claims, 8 Drawing Sheets

| 5 | 5 | 5 | 5 | 5 | n | m | m | b | b | b | b | b | 5 | 6 | 6 | 6 | 6 | 4 | K |
|---|---|---|---|---|---|---|---|---|---|---|---|---|---|---|---|---|---|---|---|
| m | m | m | m | m | m | m | m | q | N | N | b | b | m | 6 | 6 | 6 | 6 | 4 | D |
| i | m | m | m | m | 5 | 5 | 7 | 7 | 7 | 5 | d | b | m | 6 | 6 | 6 | h | P | D |
| 8 | 6 | 8 | 7 | 8 | 8 | 8 | 8 | 8 | 8 | N | d | d | m | 6 | 6 | 6 | N | P | K |
| 8 | 8 | 8 | 8 | 8 | 8 | 8 | 8 | 8 | 8 | b | b | d | q | 6 | 6 | 6 | N | S | D |
| 8 | 8 | 8 | 8 | 8 | 8 | 8 | 8 | 6 | 5 | b | b | d | m | 6 | 6 | 5 | 4 | K | D |
| 7 | 8 | 8 | 8 | 8 | 8 | 8 | 8 | 5 | m | b | b | d | m | 5 | 6 | N | P | D | D |
| 5 | 5 | 5 | 5 | 5 | 5 | 5 | 5 | m | m | b | b | 4 | m | 5 | 5 | N | K | D | D |
| m | m | m | m | n | n | n | n | m | m | b | b | N | m | 5 | N | 4 | K | D | D |
| m | m | m | m | 5 | n | m | m | m | m | m | m | N | m | 5 | N | S | K | D | D |
| 5 | 5 | m | m | n | n | n | 5 | 5 | 5 | 5 | m | m | m | N | 4 | K | D | D | K |
| 5 | 6 | 6 | 6 | 6 | 6 | 6 | 6 | 6 | 6 | 5 | m | m | m | 4 | P | K | K | D | Q |
| 6 | 6 | 6 | 6 | 6 | 6 | 6 | 6 | 5 | 5 | 5 | m | m | 5 | 4 | S | K | Q | K | Q |
| 6 | 6 | 6 | 8 | 8 | 6 | 6 | 6 | 6 | 5 | 5 | m | m | N | P | K | Q | Q | Q | Q |
| 6 | 6 | 6 | 6 | 6 | 6 | 6 | 6 | 6 | 5 | 5 | m | m | N | P | Q | W | P | Q | Q |
| 6 | 6 | 6 | 6 | 6 | 6 | 6 | 6 | 6 | 6 | 5 | 5 | 5 | N | Q | Q | W | W | P | P |
| 6 | 6 | 6 | 8 | 8 | 8 | 8 | 6 | 6 | 6 | 6 | 5 | N | P | Q | P | P | P | W | P |
| 5 | 6 | 6 | 8 | 8 | 8 | 8 | 6 | 6 | 6 | 6 | 5 | 4 | Q | P | W | W | W | W | P |
| m | 5 | 5 | 5 | 5 | 5 | 5 | 5 | 5 | 5 | N | 4 | Q | Q | W | W | W | W | P | P |
| d | q | m | m | m | m | N | N | 4 | B | K | D | D | P | r | W | W | W | P | P |

FIG. 8

| ALPH-NUMERIC CODE | COLOR | QUANITY |
|---|---|---|
| 4 | Silver Hase | 11 |
| 5 | Pale Peach | 58 |
| 6 | Sandstone | 77 |
| 7 | Cream | 5 |
| 8 | White | 51 |
| b | Tea Rose | 12 |
| d | Jade | 7 |
| h | Opal | 1 |
| i | Coral | 1 |
| m | Daisy Rose | 62 |
| n | Blossom Pink | 7 |
| q | Celery | 2 |
| r | Wedgewood | 1 |
| D | Oriental Green | 17 |
| K | Smoke Grey | 14 |
| M | Midnight Blue | 2 |
| N | Pewter | 17 |
| P | Horizon Blue | 21 |
| Q | Tile Blue | 17 |
| S | Leaf Green | 2 |
| W | Turquoise | 15 |

SYSTEM AND METHOD FOR GENERATING A PATTERN FROM AN IMAGE

Notice

Copyright ®1989 Thomas M. Carroll. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The invention generally relates to a system which starts with a predefined image and generates a pattern corresponding to the predefined image and, in particular, to computer assisted image processing for generating latch hook rug color patterns corresponding to a particular predefined image.

It has long been a favorite pastime for people to craft rug designs by hooking yarn pieces to rug canvas to make hook rugs. In making these rugs, individual colored yarns are tied to backing mats or grids, commonly referred to as a rug canvas, to form patterns. In general, the pattern corresponds to a color coded design printed on the rug canvas or to an image formed by following a pattern. Traditionally, the designs on the rug canvas have been created by a variety of processes. It is well known that such codes could be created by freehand sketching, tracing or by superpositioning images directly on the canvas. None of these processes, however, are well suited to provide patterns from which hook rugs can be created.

SUMMARY OF THE INVENTION

It is an object of this invention to provide a system and method for generating a pattern such as a hook rug pattern from a predefined image.

It is another object of this invention to provide a system and method for generating a hook rug pattern representing an image in the form of a hook rug, and for permitting an operator, using a microprocessor and a monitor, to enhance and manipulate to image to affect the hooked rug pattern.

It is another object of the system and method according to the invention to capture and view a predefined image and to edit or manipulate the captured image so that a rug pattern can be generated from the edited, manipulated image.

It is a further object of the apparatus according to the invention to generate from a scanned image a rug pattern which includes a limited number of colors as defined by a color look-up table.

It is still a further object of the invention to create, from a predefined image, a rug pattern including a color-coded table for hooking rug yarns onto a canvas to recreate the predefined image in the form of a hook rug.

Other objects and features will be in part apparent and in part pointed out hereinafter.

In one form, the invention is a system for generating a pattern for making rugs or the like corresponding to a predefined image. Means scans the predefined image and generates a video image corresponding to the predefined image. Means compresses the video image into a compressed image corresponding to the video image. Means creates from the compressed image said pattern corresponding to the predefined image.

In another form, the invention is a method of generating a pattern corresponding to a predefined image comprising the steps of: scanning the predefined image; generating a video image corresponding to the scanned image; compressing the video image into a compressed image corresponding to the video image; and creating from the compressed image the pattern corresponding to the predefined image.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
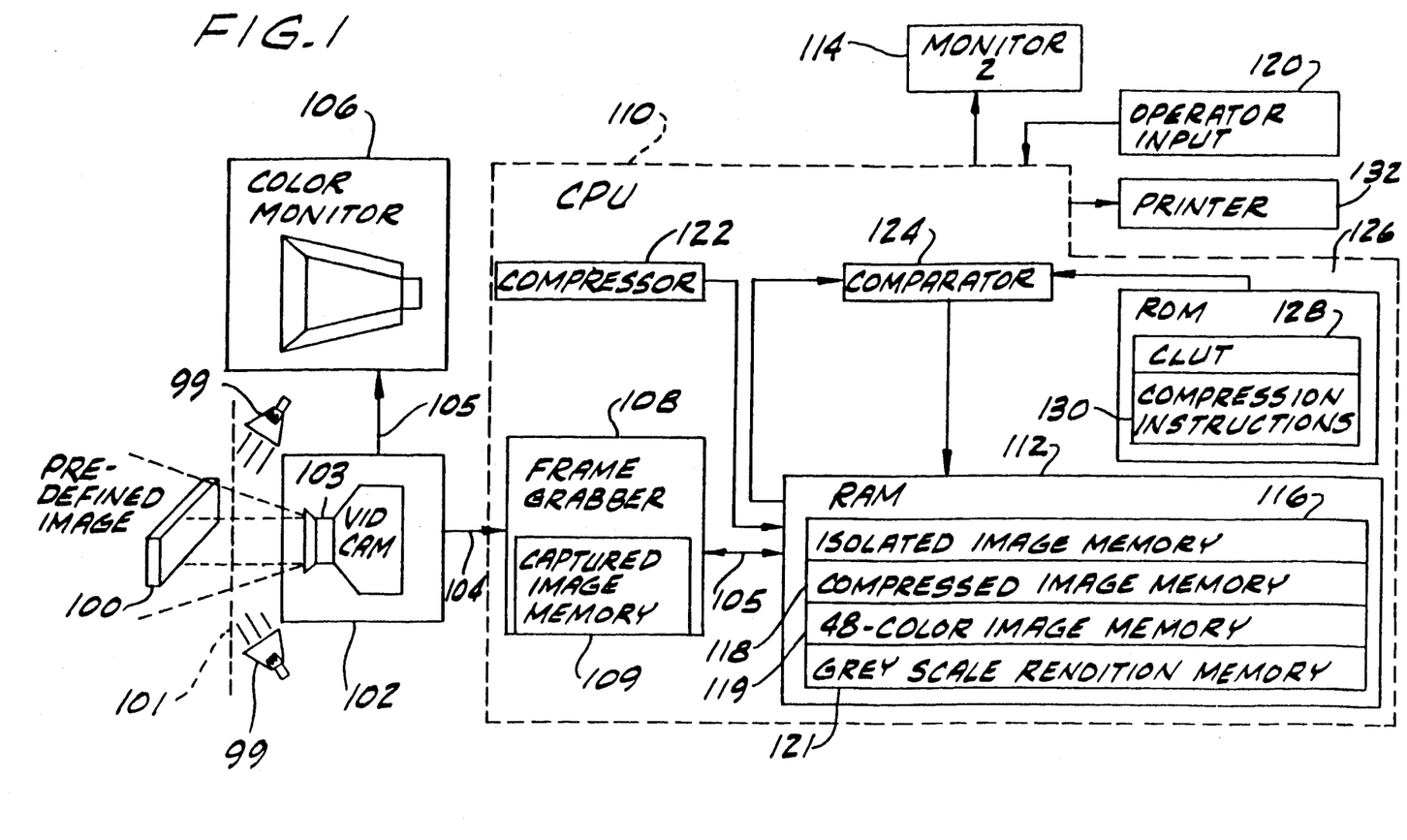
FIG. 1 is a block of a system according to the invention for printing hook rug patterns corresponding to a predefined image.

FIG. 1 is a block diagram of one preferred embodiment of a system for generating a hooked rug pattern from an image according to the invention. A predefined image 100 may consist of any fixed image, a likeness of which is to be embodied in a the pattern of a finished hooked rug. Suitable examples of image 100 include photographs, printed matter, or even live subjects in posed positions. A video camera 102 is positioned to scan predefined image 100. Upon scanning predefined image 100, camera 102 converts predefined image 100 into a conventional analog video signal provided via line 104 that is also provided to color monitor 106 via line 105 for immediate viewing. Both video camera 102 and color monitor 106 are commercially available, off the shelf units. Predefined image 100 may be enhanced by the selective use of one or more filters 101, by adjusting the light illuminating the image provided by lamps 99 and/or by any combination of lenses 103 for video camera 102.

Video camera 102, provides the video signal of the predefined image via line 104 to a frame grabber circuit 108 which is a part of central processing unit (CPU) 110. Frame grabber 108 digitizes the analog video signal and captures a single frame of the digitized signal to form a captured image 107 (See FIG. 2) having a preset number of color pixels, e.g. 192,700. The catured image 107 is stored in captured image memory 109 which is illustrated as part of frame grabber 108 but may be part of Random Access Memory (RAM) 112. CPU 110 provides the captured image 107 to a second color monitor 114. Frame grabber circuit 108 additionally provides the operator an option to enhance the captured image. By using operator input means 120, such as a keyboard or mouse to address CPU 110 and, in turn, frame grabber 108, an operator may choose either to crop, magnify, and/or change the color composition by altering the pixel colors or the overall color saturation of the captured image. Following enhancement of the captured image, frame grabber 108 provides a digital signal representative of the enhanced captured image via line 105 to Random Access Memory (RAM) 112 of CPU 110. A specific memory address within RAM 112, referred to as a isolated image memory 116, retains the enhanced captured image as an isolated image 111 (See FIG. 2) stored in memory 116.

The isolated image 111 in image memory 116 is then further processed by CPU 110. Using compression instructions 130 in Read Only Memory (ROM) 126, CPU 110 functions as a compressor 122 to reduce the resolution of the isolated image III to create a compressed image 113. Specifically, the number of pixels comprising the isolated image in image memory 116 is reduced from, for example, 192,700 to 7708 pixels. Compressor 122 subdivides the original 192,700 pixels into 7708 subareas with each subarea containing 25 of the original 192,700 colored pixels. Each of the 192,700 color pixels is identified by compressor 122 as having a mixture of red, green and blue (RGB) color values. Compressor 122 combines the RGB color values for each pixel into a single, averaged RGB color value. Each pixel therefore, is assigned a single RGB color value. Compressor 122 then assigns a single RGB color to each subarea by computing an average color value from among the color values assigned each of the 25 pixels within each subarea. Compressor 122, therefore, reduces 192,700 pixels, each having separate R,G,B color values, into 7708 subareas, each having a single R,G,B color value. Each subarea value has a color corresponding to the average of the color values assigned to the 25 pixels within each subarea, to form a compressed image 113 (See FIG. 2) stored in compressed image memory 118.

CPU 110, functioning as comparator 124, matches the assigned color value of each subarea of the compressed image 113 with one of 48-color values provided by Color Look Up Table (CLUT) 128 which is a part of ROM 126. For each subarea, CPU 110 selects the color value of the CLUT 128 which is closest to the color value of the subarea and assigns it to the subarea to form a 48-color image 115 (See FIG. 2) stored in 48-color image memory 119. Therefore, from a image comprised of 7708 subareas, where each subarea color 35 resulted from an average of 25 color pixels therein, the CPU 110 employs CLUT 128 to provide an image corresponding to the isolated image, but with a total of only 48-colors. Should one of the colors assigned to a subarea resemble more than one of the 48-colors in CLUT 128, comparator 126 defaults by choosing the lightest of the 48-colors in CLUT 128.

The 48-color image 115 is supplied both to the 48-color memory 119 and to color monitor 114 for operator viewing and optional operator enhancement. At this point, the operator may simultaneously view the isolated image in memory 116 and the 48-color image in memory 119 by instructing CPU 110 to display these images, side-by-side, on monitor 114. Enhancement options include changing the color assigned either to a single subarea or a group of subareas, cropping and/or magnifying the 48-colored image. In one preferred embodiment, such operator enhancements are achieved through the use of off the shelf graphics software such as Supermac's 's PixelPaint.

Figure 5:
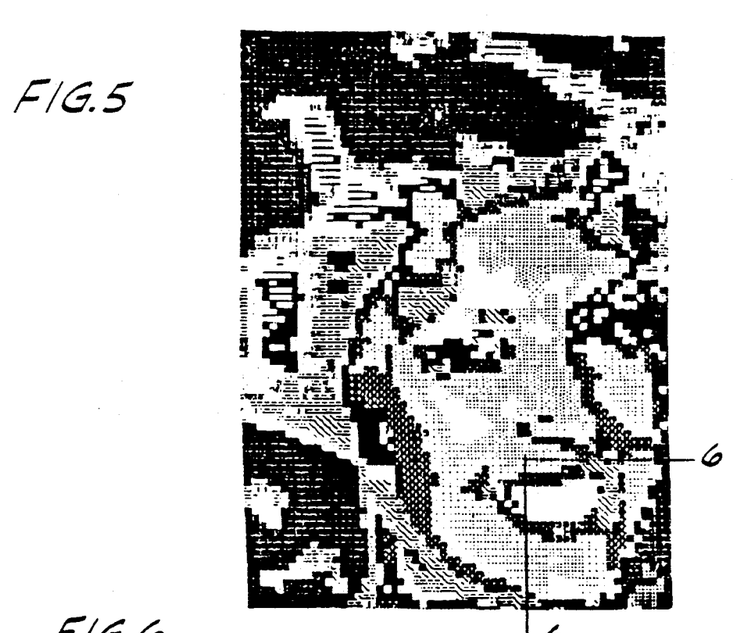
FIG. 5 illustrates a example of a gray scale image according to the invention corresponding to a predefined image.
Figure 6:
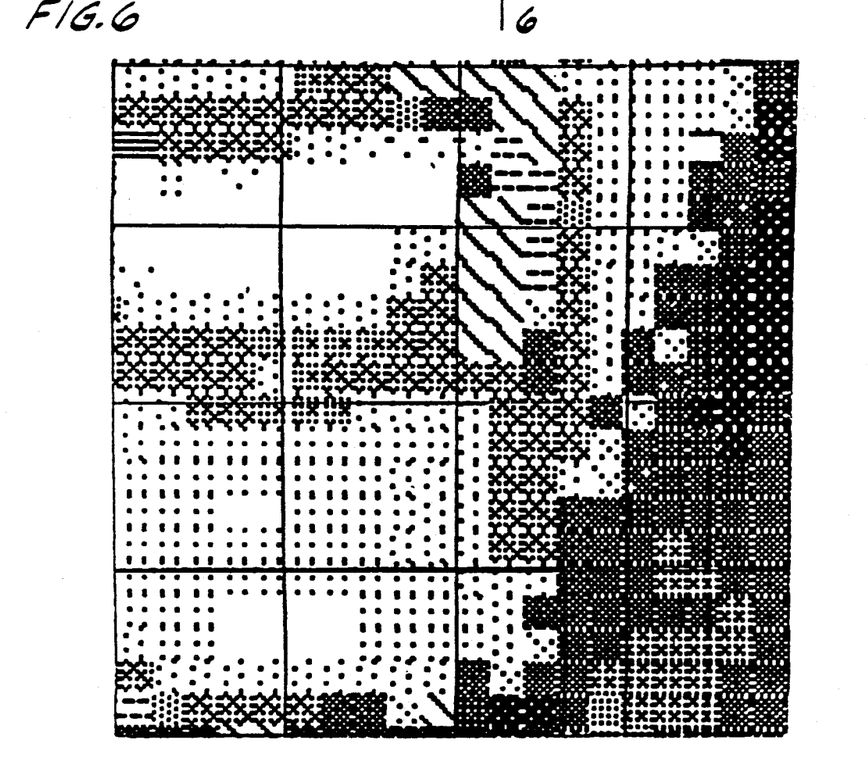
FIG. 6 is an enlarged view of the lower right portion of FIG. 5 enclosed by lines 6—6.

Following enhancement of the 48-color image, the operator has available the option to generate a grey scale rendition of the 48-color image such as shown in FIGS. 5 and 6. Such a rendition would approximate the appearance of a finished rug by substituting variously shaded grey blocks for the 48-colors assigned to the subareas. Accordingly, the operator would instruct CPU 110 to generate a grey scale rendition for display on the second color monitor 114 and/or for print-out from printer 132. CPU 110 provides the grey scale rendition to grey scale memory 121 in RAM 112.

Figure 7:
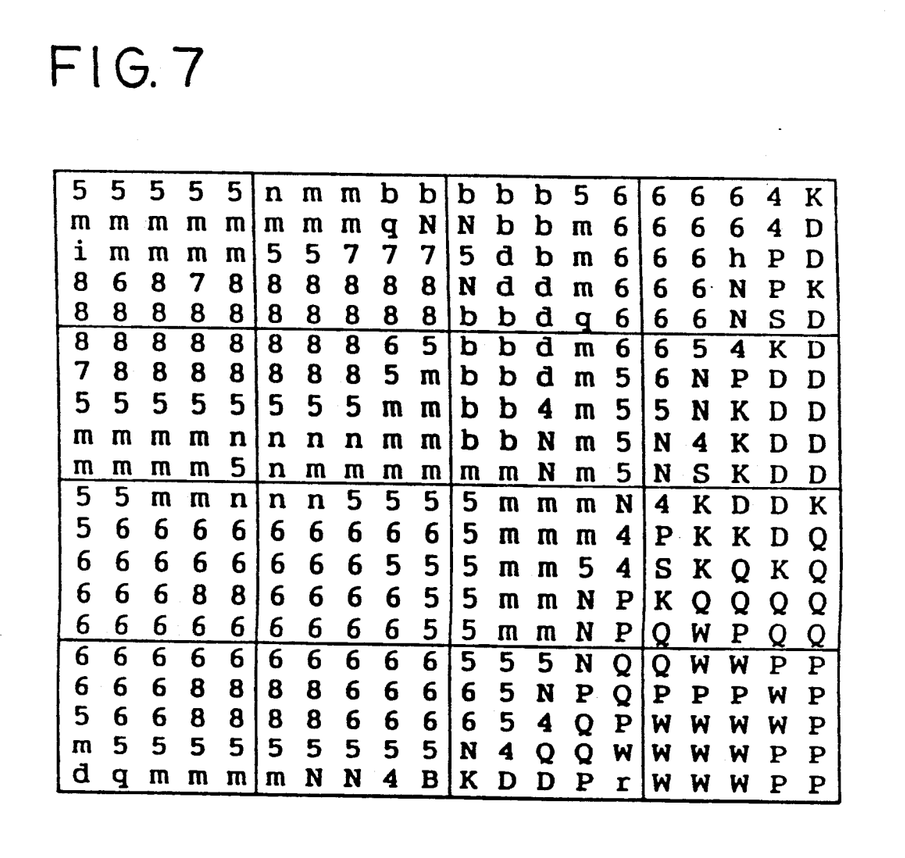
FIG. 7 illustrates a color coded rug pattern according to the invention corresponding to the gray scale image in FIG. 6.
Figure 8:
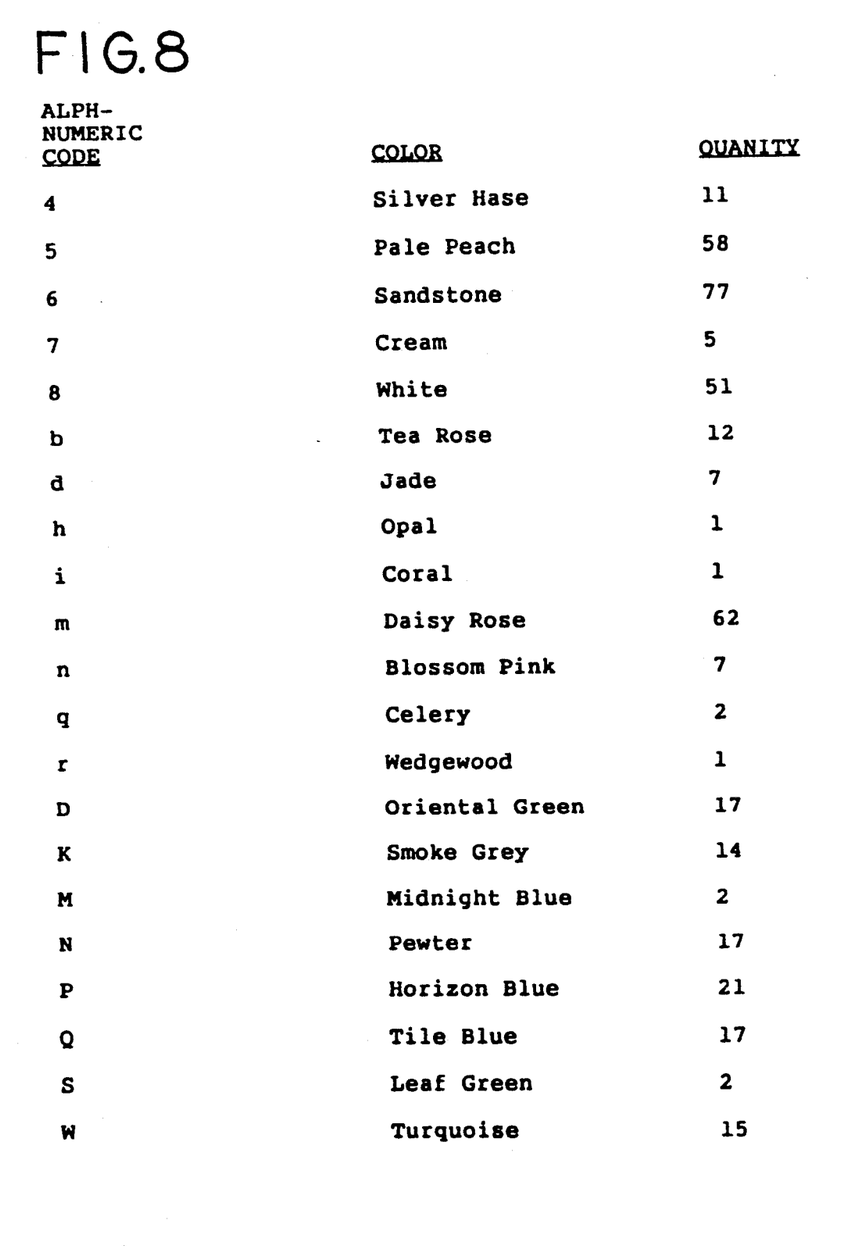
FIG. 8 is a table of the inventory of rug yarns specified in the pattern of FIG. 7 and needed to create a rug in accordance with the pattern.
Figure 9:
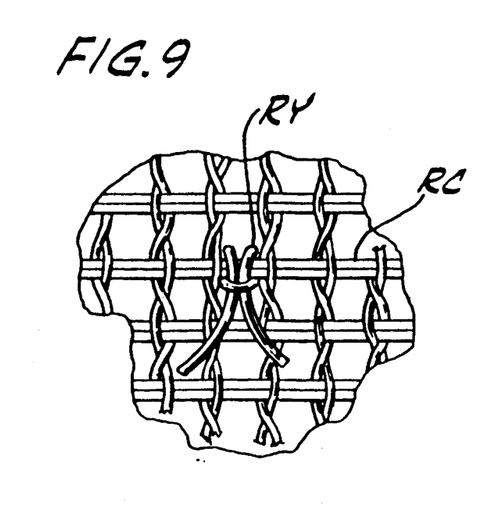
FIG. 9 is an enlarged illustration of a portion of a rug canvas having a rug yarn applied to one of its horizontal members.

Once satisfied with the enchanced 48-color image 115, the operator instructs CPU 110 through operator input means 120 to cause printer 132 to print out a specific pattern corresponding to the 48-color image in memory 119. Each pattern consists of 7708 coordinates specified by a number/letter code corresponding to the specific color value assigned to each subarea by CLUT 128. In particular, the pattern corresponds to a rug pattern such as shown in FIG. 7 used to make a hook rug. Following printing of the rug pattern, CPU 110 causes printer 132 to compile the numbers and colors of rug yarns needed and to print out an inventory identifying all the colors of the 48-color image and the number of times each color appears in the rug pattern. The inventory includes the generic name of each color, the number/letter code and how many pieces of yarn will be needed for each color. An inventory of the rug pattern shown in FIG. 7 is illustrated in FIG. 8. By hooking rug yarns RY according to the rug pattern to a rug canvas RC as shown in FIG. 9, a hook rug having an image resembling the predefined image can be created.

Figure 2:
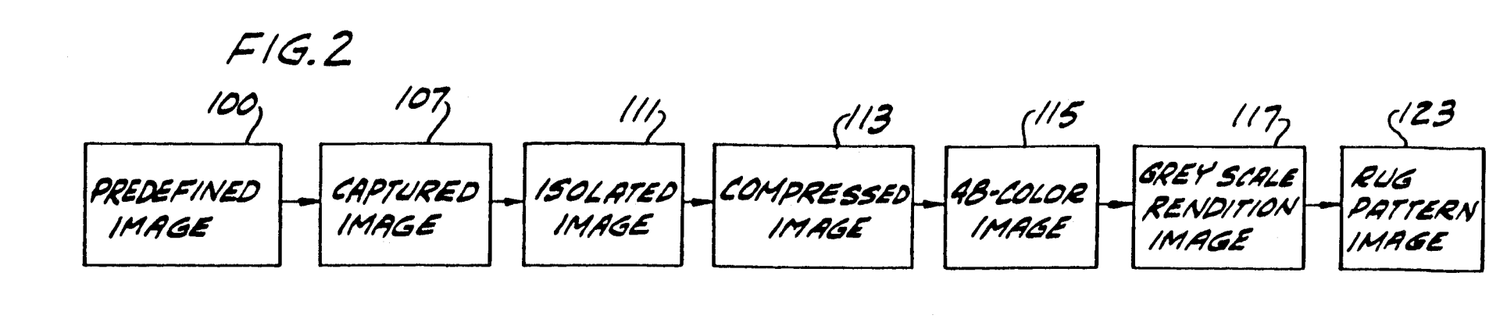
FIG. 2 is a block diagram of the sequence of the various images generated according to the invention in the course of processing a predefined image into a hook rug pattern.

The sequence of the various images generated during the course of processing the hook rug pattern are illustrated by the block diagram in FIG. 2. Predefined Image 100 represents the object desired to be reproduced by the pattern of the finished hooked rug. In the present embodiment, predefined image 100 represents any picture or photograph. However, according to the current invention, any fixed image could serve as predefined image 100. At the operator's option, predefined image 100 may be enhanced with the use of special lighting 99 which may include the use of various filters 101.

The video image representation of the predefined image 100 as scanned by a video camera and displayed on first video monitor 106 is captured by frame grabber 108 as a captured image 107 stored in memory 109. The captured image is then stored as isolated image 111 in memory 116. As viewed on a second video monitor, isolated image 111 is a single frame of the enhanced video image that has gone through an analog to digital conversion and that has been saved to memory. The frame grabber in the preferred embodiment is one of conventional design such as a RasterOps by RasterOps. Again, the operator may choose to change the image at this point. Using operator input to access enhancement instructions provided by the frame grabber or CPU, isolated image 117 may be selectively cropped, magnified, and/or have its pixel color or color saturation changed. Once finished with the changes, the CPU stores the enhanced isolated image 111 as changed to memory.

Compressed image 113 results from further processing isolated image 111 to reduce its resolution. The number of pixels and R,G,B pixel color values for each subarea, as noted above, are averaged. The CPU 110 then further reduces the number of levels of colors of each subarea by generating a image having a preset number of colors e.g. 48, illustrated in the preferred embodiment as 48-color image 115. The 48-color- image 115 is produced when the CPU matches the color of each pixel in compressed image 113 with one of 48-colors listed in a Color Look Up Table (CLUT) stored in memory. Once the color match is accomplished, the CPU then assigns the matched CLUT color to the corresponding subarea. The resulting 48-color image 115 would generally contain fewer colors than compressed image 113, and in no event contains more than the preset number of colors listed in CLUT, such as the 48-colors contained in 48-color image 115.

A second color monitor then displays both isolated image 111 and 48-color image 115 side by side. This provides the operator the opportunity to compare the color composition of the isolated image 111 to the 48-color image 115. If the operator desires to change the color composition of the 48-color image 115 to conform more closely to isolated image 111, color enhancement of 48-color image 115 is provided by means of a graphics software program such as PixelPaint by Supermac. Such programs allow for enhancement of colors either on a global or specific basis by the use of an input device to the CPU such as a mouse or keyboard.

Once satisfied with 48-color image 115, the operator has available an option to generate grey scale image 117 in order to approximate the appearance of the finished hook rug. To accomplish this, the CPU, via the CLUT, matches and replaces the colors of the 48-color rug image 115 with various shades of grey. The resulting grey scale rendition (as illustrated for example in FIGS. 5 and 6) is available for viewing on both the computer's color monitor or as a printout from the computer's printer. After evaluating grey scale image 117, the operator may decide that more color enhancements to the 48-color image 115 are necessary. As before, enhancement to the 48-color image 115 may be made via graphics software. Should enhancement be preformed, subsequent opportunity exits to generate subsequent grey scale renditions corresponding to the enhanced 48-color image 115.

Following any final enhancement to 48-color image 115, the CPU generates a printout of rug pattern image 123 via the computer's printer. As illustrated by FIG. 7, Rug pattern image 123 is a matrix of number or letters, where each number or letter corresponds to the position and color of each colored subarea comprising 48-color image 115. According to the preferred embodiment, the CPU assigns one of 48 numbers or letters, corresponding to the 48-colors listed in the CLUT, to their corresponding position in the 48-color image 115. Rug pattern image 123 thus serves as an instructional guide for hooking a particular color of rug yarn RY to a rug canvas RC as shown in FIG. 9 in such a fashion as to replicate Predefined image 100. Faithfully hooking the rug yarns to the rug canvas according to coded rug pattern 123 assures that the finished hook rug will correspond to 48-color image 115 and predefined image 100.

Figure 3A:
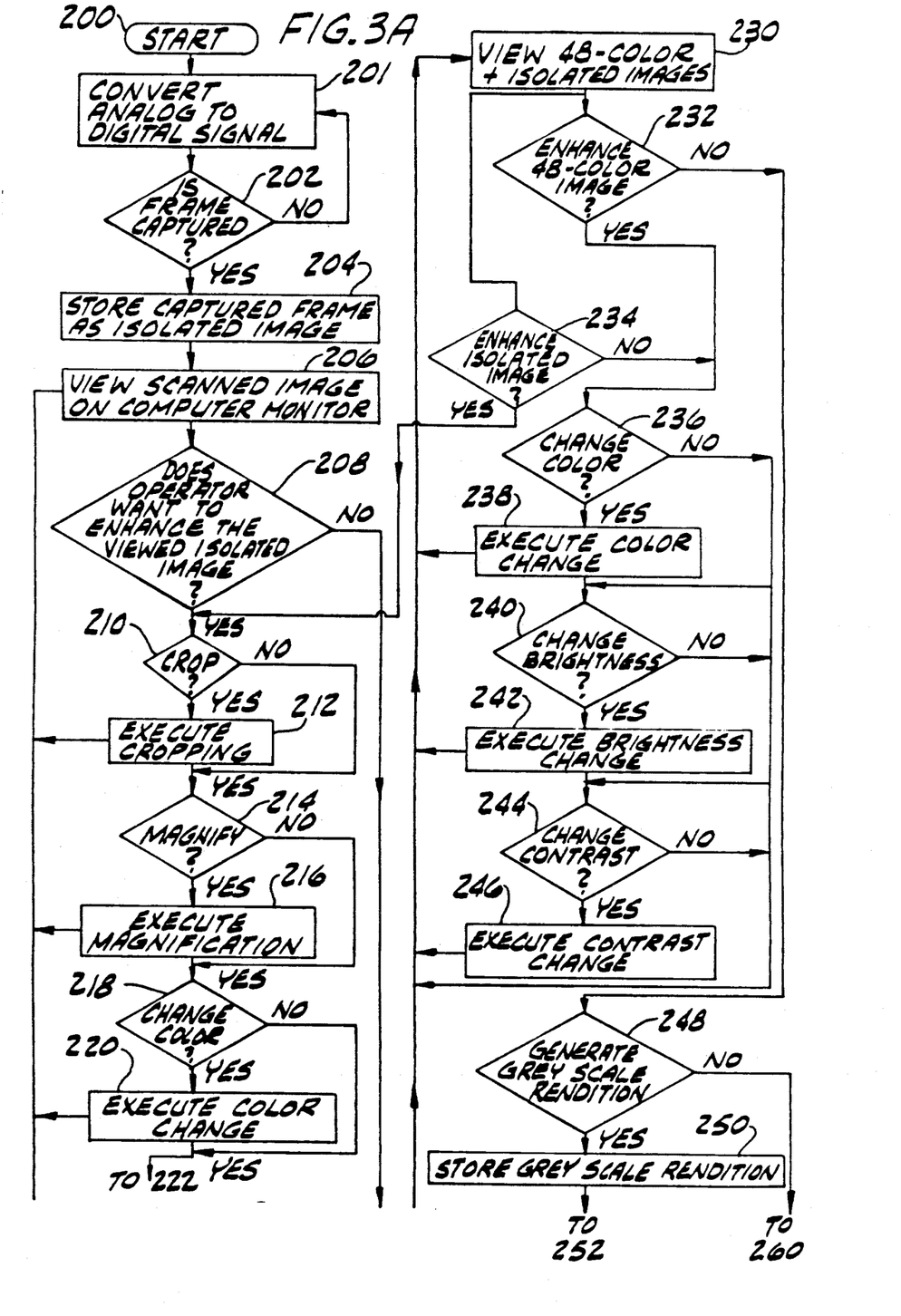
FIGS. 3A and 3B are a flow chart of the operation of the system described in FIG. 1 from capturing a frame to printing a hook rug pattern and inventory.
Figure 3B:
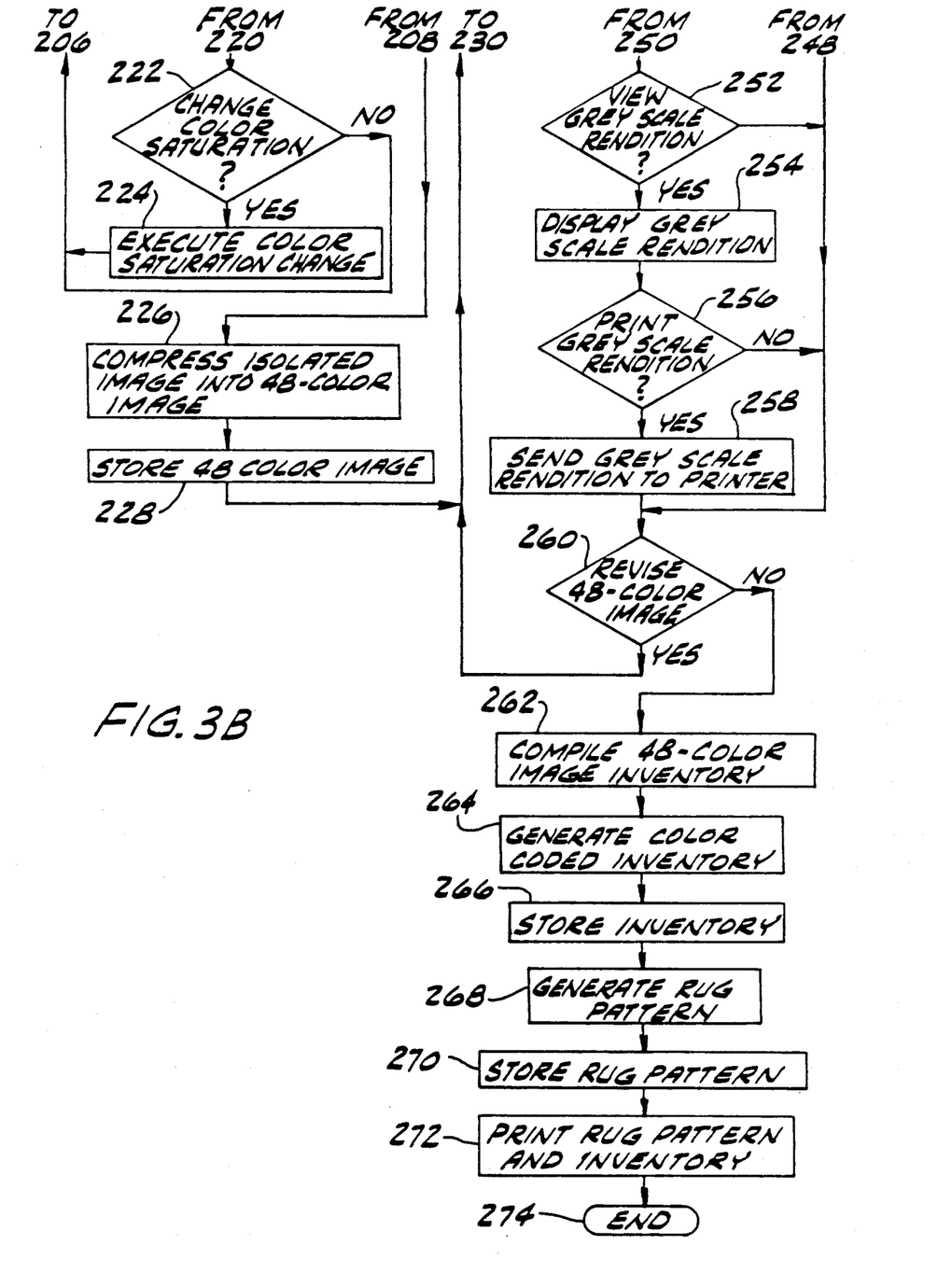

A detailed description of the operation of the invention illustrated by FIG. 1 is presented by the operational flow chart of FIGS. 3A and 3B. Proceeding from start step 200, scanned video camera signals are converted from an analog to a digital signal at step 201. From here, image processing proceeds only if at decision step 202 it is determined that an entire frame of the digitized video signal of the predefined image has been captured by a frame grabber 108. Until an entire frame is captured, the processing procedure returns to signal conversion step 201 to complete the capture process. The captured predefined image is converted from analog to a digital signal and stored by step 204 in an isolated image memory that is a part of RAM.

Once stored in RAM, the isolated image 103 is made available at step 206 for viewing on the CPU's color monitor 114. This occasions the next step 208 of having the operator decide whether to enhance the isolated image presented on the CPU monitor. If none of the enhancement options are selected, image processing continues at step 226 with compression of the isolated image. Conversely, a decision to enhance the isolated image presents the operator with four alternative options shown in succession for convenience. The operator must decide whether the isolated image should be cropped by step 210, magnified by step 214 or whether to change the image's color composition by step 218 or color saturation by step 224. An affirmative response to any of the four options steps 210, 214, 218, or 222, elicits the corresponding execution at steps 212, 216, 220, and 224, respectively. Following execution of each option, the resultant change in the isolated image is presented on the CPU's color monitor at step 206. This allows the operator to further select among the four options to enhance the isolated image.

On deciding at step 208 that no further enhancements to the isolated image are needed, the isolated image is then processed into a 48-color image at step 226. In particular, the isolated image is compressed by reducing its resolution and the number of colors to create, for example, a 48-color image. The 48-color image is in turn stored in the CPU's memory at step 228, and displayed on the CPU's color monitor along side the finalized version of the isolated image. After viewing both isolated and 48-color images, the operator decides at steps 232 and 234 whether to enhance the 48-color and/or isolated images. If the images are satisfactory, image processing continues at step 248 to optionally generate a grey scale image. The operator has the option of enhancing the 48-color image at step 232 or enhancing the isolated image at step 234.

A decision to enhance the isolated image at step 234 returns the image processing to the four options at steps 210, 214, 218, 222 and subsequent steps leading once again to decision at step 232 whether to enhance the 48-color image. Alternatively, the operator can decide to enhance the 48-color image at step 232. By deciding to enhance its color composition at step 236, color brightness at step 240, or color contrast at step 244. Following a choice of any of the enhancements at steps 236, 240, 244, with their respective executions at step 238, 242, and 246, the enhanced 48-color image is once again displayed for viewing at step 230, and presented for enhancement at step 232. This sequence repeats itself until the operator decides that no further enhancement of the 48-color image is desired.

With a satisfactory 48-color image, image precessing continues by deciding to generate a grey scale image at step 248. If generated, it is stored in the CPU's memory at step 250. Following this, the operator must decide whether to view to grey scale image on the CPU monitor. If the operator wishes to view the grey scale image at step 252, it is displayed on the CPU's monitor at step 254 with the option to have a printout of it at step 256 executed by computer printer at step 258. Following either the decision not to generate, view or print the grey scale image, the operator is given the option to revise the 48-color image at step 260.

A choice to revise the 48-color image at step 260 returns the image processing to step 228 and all subsequent steps. On choosing not to revise 48-color image at step 260, image processing continues by compiling at step 262 an inventory of the colors of the 48-color image. This inventory is arranged by alpha-numeric color code and generated at step 264. It is thereafter stored in memory at step 266. Subsequently, at step 268 the CPU generates a rug pattern corresponding to the 48-color image. The CPU then stores the rug pattern to memory at step 270 and signals the computer's printer to print a copy of both the rug pattern and inventory at step 272. With printing complete, imaging processing is finished at step 274.

Figure 4:
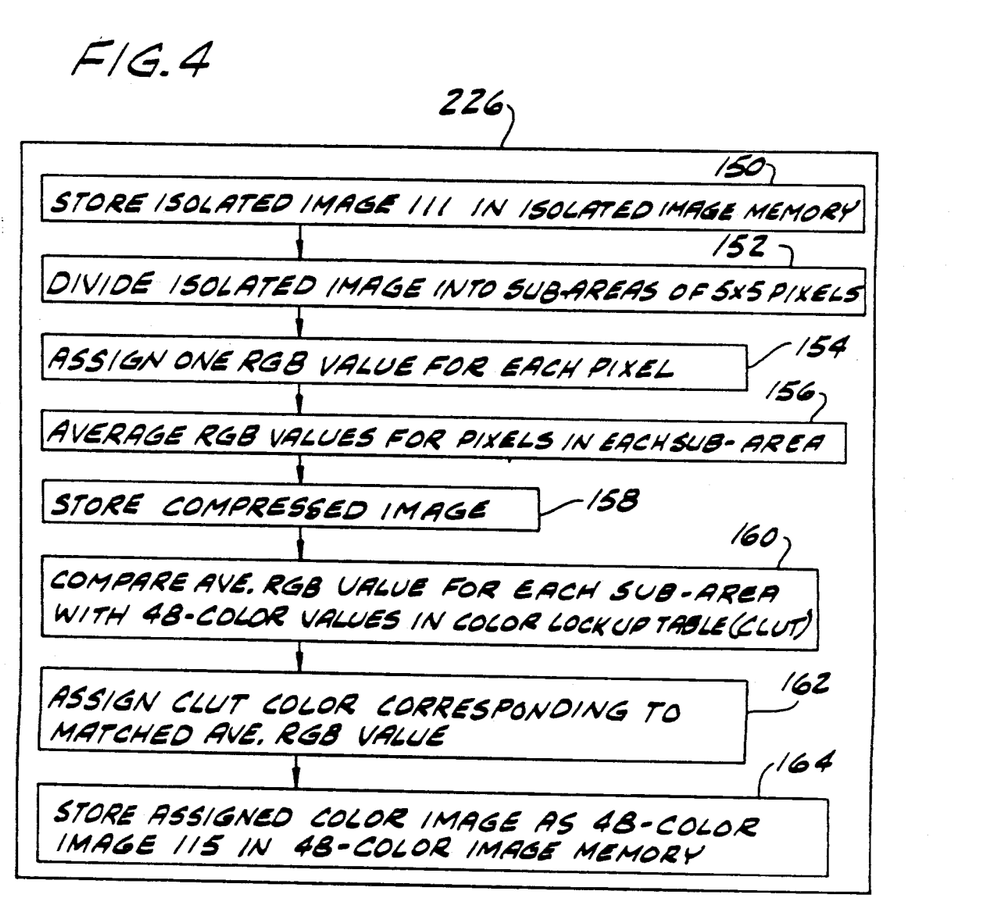
FIG. 4 is a flow chart of the steps involved in compressing the isolated image into a 48-color image.

Further explanation of how the 48-color image is generated at step 236 is illustrated by FIG. 4.

Isolated image 111, after being stored to RAM memory 116 by step 150, has 192,700 pixels, CPU 110 subdivides the image into 7708 square subareas of 25 pixels each at step 152, according to instructions supplied to from ROM 126. The CPU 110 then, at step 154, assigns each of the 192,700 pixels a single RGB value. This single RGB value results from averaging the three red (R), green (G) and blue (B) values assigned by the CPU to each pixel. These three values range from 1 to 8 according to the color composition of each pixel of isolated image 111. The single RGB values of pixels within a subarea are next averaged at step 156 to produce a compressed image 113, according to the preferred embodiment, comprising 7708 colored subareas. The number of subareas (7708) is the quotient of dividing the number of pixels (192,700) by the size of the subareas (25).

After preforming step 156 for each of the 192,700 pixels of isolated image 111, the compressed image 113 is next stored at step 158 in the RAM memory 112 where it can modified as described in the steps 232 to 246 of FIG. 3.

Having created a satisfactory compressed image 113, the CPU 110 at step 160 compares the single RGB value of each subarea with a list of colors stored in ROM memory 126. According to the present embodiment, this list is called the Color Look Up Table (CLUT) 128 and comprises 48 color values against which the 7708 subarea colors are compared and matched. The CLUT color closest to the single RGB color value is selected. In the event that the single RGB color value is close to two or more CLUT colors, the CPU selects the lighter of the CLUT color values. Subsequently, at step 162, the CPU assigns the selected color from the CLUT to its corresponding subarea. This has the effect of limiting the number of colors present in compressed image 113 to a number equal to or less than 48 in 48-color image 115. The final step 164 of generating 48-color image 226 is to have the CPU store the 48-color image to memory 119 as depicted in FIG. 1.

FIG. 5 illustrates a particular grey scale image composed of various shades of grey squares. This is represented even more clearly in FIG. 6 which is an enlarged view of the section of FIG. 5 indicated by line 6—6. Each of the variously shaded grey squares of FIGS. 5 &6 correspond to a particular colored subarea in the compressed image, and by implication, to the average color value from the 25 pixels of each subarea in the isolated image.

Moreover, each of the grey scale image squares in FIG. 6 corresponds to the portion of the hook rug pattern illustrated in FIG. 7. Each square of FIG. 6 and each symbol of FIG. 7 correspond to a particular color of yarn used by the hook rug maker to generate a finished colored hook rug. With the use of a rug canvas RC (FIG. 9) for hooking yarn pieces, colored yarn RY (FIG. 9), a hooking device (not shown) and a printout of the alpha-numerically coded rug pattern as illustrated in FIG. 7, a hook rug maker can easily reproduce the colored pattern of the 48-color image. Faithfull adherence to the code on the coded printed rug pattern 123 while hooking rug pieces on the canvas results in a finished hook rug pattern corresponding to the predefined image scanned by the video camera.

A table of the particular rug yarn colors, the corresponding alpha-numeric code of each color and quantity of each rug yarn in the pattern is illustrated in FIG. 8. This table provides a convenient indication the number of yarn pieces needed for each rug. For example, corresponding to the alpha-numeric code 4, the color is silver haze and the quantity as represented in FIG. 7 is 11 pieces. Such an inventory as illustrated in FIG. 8 provides the hook rug supplier with a convenient means for knowing how many different colored yarn pieces to supply the hook rug maker.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A system for generating a rug pattern corresponding to a predefined image comprising:
   means for scanning the predefined image and generating a video image corresponding to the predefined image;
   means for compressing the video image into a compressed image corresponding to the video image;
   means for creating from the compressed image said rug pattern corresponding to the predefined image; and
   means for specifying an inventory of individual rug yarns needed for attachment to a rug canvas in order to make a rug corresponding to said rug pattern.

2. The system of claim 1 comprising a rug kit including the rug pattern, a rug canvas for use with the rug pattern, and individual rug yarns corresponding to the inventory whereby a rug corresponding to the predefined image can be assembled.

3. The system of claim 2 wherein the specifying means comprised means for compiling from said rug pattern an inventory identifying colors and numbers of the rug yarns to be used for assembling the rug corresponding to said predefined image.

4. The system of claim 1 wherein said means for scanning the predefined image includes means for generating a color video image corresponding to the predefined image.

5. The system of claim 4 wherein said scanning means further comprises a video camera detecting the predefined image and providing an analog output signal including multiple frames which correspond to the predefined image.

6. The system of claim 5 further comprising means for enhancing said predefined image including one or more lenses and/or filters selectively positioned between said camera and said predefined image.

7. The system of claim 5 wherein said means for compressing further comprises means for isolating a single frame of the video image from said multiple frames.

8. The system of claim 7 wherein said means for isolating further comprises means for digitizing said video image by converting the analog signal of the isolated single frame into a digital signal.

9. The system of claim 8 wherein said means for digitizing further comprises a frame grabber adapted to isolate a single frame of the video image and convert said analog output signals from said video camera into digital signals.

10. The system of claim 8 wherein said means for compressing further comprises a microprocessor adapted to compress said digital signal into a set of digital data corresponding to said compressed image, said digital data including less resolution than said digital signal.

11. The system of claim 10 wherein said microprocessor includes a memory adapted to store said digital signal, said digital data and a digital representation of said pattern.

12. The system of claim 10 wherein said microprocessor includes means responsive to operator input for changing the color composition of said video image.

13. The system of claim 10 wherein said microprocessor includes means for modifying said video image by selectively magnifying or selectively changing the color composition of said video image.

14. The system of claim 1 wherein said video image comprises a preset number of pixels, each pixel corresponding to the color at a particular location within the video image.

15. The system of claim 14 wherein said means for compressing comprises means for assigning a color value to each said pixel.

16. The system of claim 15 wherein said means for compressing further comprises means for dividing said pixels into a preselected number of pixel subareas, each subarea having a predefined number of pixels.

17. The system of claim 16 wherein said means for compressing comprises means for assigning to each said subarea a subarea color value which is a function of the assigned color values of the pixel in said subarea.

18. The system of claim 17 further comprising means for comparing said subarea color value to a color look-up table specifying a variety of colors representative of rug yarns.

19. The system of claim 18 further comprising means for selecting from the variety of colors a color corresponding to said subarea color value.

20. The system of claim 19 further comprising means for selecting among said variety of colors which are similar to the subarea color value, the lighter of the variety of colors.

21. The system of claim 19 further comprising means for generating from the compressed image a gray scale image corresponding to the predefined image, wherein said gray scale image comprises a grid of gray patterns, each pattern of which corresponds to one of said variety of colors.

22. The system of claim 19 further comprising means responsive to operator input for altering said selected variety of colors corresponding to each of the subarea color values.

23. The system of claim 19 further comprising means for determining the amount of rug yarns of each color corresponding to said selected variety of colors.

24. The system of claim 1 further comprising means for generating from the compressed image a gray scale image corresponding to the predefined image.

25. The system of claim 1 wherein said means for creating comprises a printer.

26. The system of claim 1 further comprising means for displaying, side by side, the video image and the compressed image.

27. A method of generating a rug pattern corresponding to a predefined image comprising the steps of:
scanning the predefined image;
generating a video image corresponding to the scanned predefined image;
compressing the video image into a compressed image corresponding to the video image;
creating from the compressed image said rug pattern corresponding to the predefined image; and
specifying an inventory of individual rug yarns needed for attachment to a rug canvas in order to make a rug corresponding to said rug pattern.

28. The rug pattern generated by the method of claim 27 including means for identifying locations of the individual rug yarns on the rug canvas which correspond to the predefined image.

29. The method of claim 27 comprising the steps of assembling a rug kit including the rug pattern, a rug canvas for use with the rug pattern, and individual rug yarns corresponding to the inventory whereby a rug corresponding to the predefined image can be assembled.

30. The method of claim 29 wherein the specifying step comprises the steps of compiling from said rug pattern an inventory identifying colors and numbers of the rug yarns to be used for assembling the rug corresponding to said predefined image.

31. The method of claim 27 further comprising the steps of enhancing said predefined image including providing one or more lenses and/or filters selectively positioned between to change said predefined image.

32. The method of claim 27 wherein said video image comprises a preset number of pixels, each pixel corresponds to the color at a particular location within the video image.

33. The method of claim 32 wherein said step of compressing comprises assigning a color value to each said pixel.

34. The method of claim 33 wherein said compressing step further comprises dividing said pixels into a preselected number of pixel subareas, each subarea having a predefined number of pixels .

35. The method of claim 34 wherein said compressing step further comprises assigning to each said subarea a subarea color value corresponding to the average of the assigned color values of the pixel in said sub area.

* * * * *